United States Patent
Schlak et al.

(10) Patent No.: US 12,531,404 B2
(45) Date of Patent: Jan. 20, 2026

(54) PROGRAMMABLE POWER DISSIPATION-CONTROLLED ELECTRONIC CIRCUIT BREAKER FOR HIGH VOLTAGE DISTRIBUTION

(71) Applicant: International Business Machines Corporation, Armonk, NY (US)

(72) Inventors: Robert B Schlak, Hyde Park, NY (US); Samuel Oludare Bamgbose, Beacon, NY (US); Timothy Kilmer, Poughkeepsie, NY (US)

(73) Assignee: International Business Machines Corporation, Armonk, NY (US)

( * ) Notice: Subject to any disclaimer, the term of this patent is extended or adjusted under 35 U.S.C. 154(b) by 141 days.

(21) Appl. No.: 18/528,848

(22) Filed: Dec. 5, 2023

(65) Prior Publication Data

US 2025/0183649 A1    Jun. 5, 2025

(51) Int. Cl.
  *H02H 3/00* (2006.01)
  *H02H 1/00* (2006.01)
  *H02H 3/087* (2006.01)
  *H02H 3/093* (2006.01)

(52) U.S. Cl.
  CPC .......... *H02H 3/093* (2013.01); *H02H 1/0007* (2013.01); *H02H 3/006* (2013.01); *H02H 3/087* (2013.01)

(58) Field of Classification Search
  None
  See application file for complete search history.

(56) References Cited

U.S. PATENT DOCUMENTS

| | | | |
|---|---|---|---|
| 5,861,737 A | 1/1999 | Goerke | |
| 6,127,882 A | 10/2000 | Vargha et al. | |
| 6,515,840 B2 | 2/2003 | Covi | |
| 7,919,956 B2 | 4/2011 | Schlak | |
| 8,917,064 B2 | 12/2014 | Schlak | |
| 9,455,565 B2 * | 9/2016 | Barnette | H02H 3/08 |
| 10,539,629 B2 | 1/2020 | Gu | |

(Continued)

OTHER PUBLICATIONS

International Searching Authority, "Notification of Transmittal of the International Search Report and the Written Opinion of the International Searching Authority, or Declaration," Patent Cooperation Treaty, Feb. 28, 2025, 15 pages, International Application No. PCT/EP2024/080204.

(Continued)

*Primary Examiner* — Stephen W Jackson
(74) *Attorney, Agent, or Firm* — Monchai Chuaychoo

(57) ABSTRACT

An approach for controlling power distribution with respect to an ECB (electronic circuit breaker) is disclosed. The approach employs a microcontroller inside the ECB to directly control startup current, which facilitates optimization of startup and shutoff current ramp for specific switch and load types as well as mitigate the damaging negative voltages due to inductive "kick" at shutoff. Also, because of concurrent energy monitoring optimized for the MOSFET operating mode during startup, a pre-charge circuit is no longer needed. Furthermore, multiple overcurrent thresholds and energy limits allow for optimization of self-protection and system robustness. Downloadable thresholds provide flexibility to support variations in system configurations and ECB componentry.

19 Claims, 10 Drawing Sheets

(56) References Cited

U.S. PATENT DOCUMENTS

| | | | |
|---|---|---|---|
| 10,541,530 | B2 | 1/2020 | Kennedy |
| 11,050,349 | B2 | 6/2021 | Wei |
| 11,398,724 | B1 | 7/2022 | Yang |
| 11,408,923 | B2 | 8/2022 | Guedon |
| 11,469,587 | B2 | 10/2022 | Kang |
| 11,539,202 | B1 | 12/2022 | Contrael |
| 2002/0015272 | A1 | 2/2002 | Hattori |
| 2003/0095368 | A1 | 5/2003 | Daniels et al. |
| 2004/0090726 | A1 | 5/2004 | Ball |
| 2017/0373602 | A1 | 12/2017 | Lian |
| 2018/0366938 | A1 | 12/2018 | Bolanos et al. |
| 2019/0341841 | A1 | 11/2019 | Dickey |
| 2021/0257831 | A1* | 8/2021 | Vandergrift ............ H02H 3/087 |
| 2022/0038096 | A1* | 2/2022 | Link .................. H03K 17/6874 |
| 2022/0368127 | A1 | 11/2022 | Chin |
| 2023/0005676 | A1 | 1/2023 | Ho |
| 2023/0058021 | A1 | 2/2023 | Pengfei |
| 2023/0163587 | A1 | 5/2023 | Lu |
| 2023/0411952 | A1* | 12/2023 | Chaperon ............. H02H 3/335 |

OTHER PUBLICATIONS

Jadli et al., "A Method For Selection Of Power MOSFETs To Minimize Power Dissipation", MDPI, Electronics 2021, 10, 2150, https://doi.org/10.3390/electronics10172150, Published Sep. 3, 2021, 8 pages.

Jadli et al., "Measurement Of Power Dissipation Due To Parasitic Capacitances Of Power MOSFETs", IEEE Acccess, accepted Oct. 8, 2020, date of publication Oct. 12, 2020, date of current version Oct. 23, 2020, vol. 8, Digital Object Identifier 10.1109/ACCESS.2020.3030269, 9 pages.

Komatsu, Masaaki, "Basic Evaluation for the DC Circuit Breaker Using Power Semiconductor with Fault Current Limiting Feature" 2017 IEEE International Telecommunications Energy Conference (INTELEC), Broadbeach, QLD, Australia, 2017, pp. 113-120, doi: 10.1109/INTLEC.2017.8211688, 8 pages.

Marroqui et al., "LVDC SiC MOSFET Analog Electronic Fuse With Self-Adjusting Tripping Time Depending on Overcurrent Condition", IEEE Transactions on Industrial Electronics, vol. 69, No. 8, Aug. 2022, Digital Object Identifier 10.1109/TIE.2021.3104606, 9 pages.

Qin et al., "A Digital-Controlled SiC-Based Solid State Circuit Breaker With Soft Switch-Off Method For DC Power System", Electronics Aug. 2019, 837; doi: 10.3390/electronics8080837, MDPI, Published Jul. 26, 2019, 15 pages.

Xie et al., "A Cost-Effective DC Circuit Breaker With Series-Connected Power Devices Using A Single Gate Driver", IEEE Access, accepted Jul. 26, 2023, date of publication Jul. 31, 2023, date of current version Aug. 4, 2023, Digital Object Identifier 10.1109/ACCESS.2023.3300029, vol. 11, 10 pages.

* cited by examiner (Startup)

PROGRAMMABLE POWER DISSIPATION-CONTROLLED ELECTRONIC CIRCUIT BREAKER FOR HIGH VOLTAGE DISTRIBUTION

BACKGROUND

The present invention relates generally to power distribution with a MOSFET (metal-oxide-semiconductor field-effect transistor), and more particularly to a programmable circuit breaker for high voltage distribution relating to the MOSFET.

An ECB (electronic circuit breaker) circuit has been used for decades in high-voltage power distribution in large computer systems to provide on/off control and sensing, as well as fault isolation. The main function of the ECB is to connect (and disconnect) a power source to a load. The ECB protects that source from overloads, particularly short circuits, that might occur in the load.

SUMMARY

Aspects of the present invention disclose an ECB device, method and a system for providing more robust and flexible system protection. The device may include, the ECB coupled to one or more power sources, one or more loads and a host PC; the ECB comprises of, one or more microcontrollers, one or more analog current limiting circuits and one or more wiring connections, wherein the one or more wiring connections is coupled to one or more circuit elements, the one or more microcontrollers, the analog current limiting circuit, the one or more power sources, the one or more loads and the host PC; and the one or more circuit elements comprises, one or more MOSFETs (metal oxide field effect transistors), one or more capacitors, one or more resistors, one or more inductors, one or more fuses, one or more grounding points.

The method may include, at startup, incrementally increase voltage to a startup current limit value that causes a metal-oxide-semiconductor field-effect transistor (MOSFET) to operate in a linear mode that is not fully enhanced; perform interrupt-triggered low energy limit (LEL) calculations based on current and voltage readings and a Gate_Low input, wherein if the LEL threshold has not been exceeded, then the ECB is fully activated, otherwise a shutoff routine is initiated to shutoff the ECB; and during operation, perform the interrupt-triggered low energy limit (LEL) calculations based on the Gate_Low input and the current and voltage reading, wherein, if the current exceeds an OC (overcurrent) threshold that is below a CL (current limit) threshold, then perform higher energy limit (HEL) calculations, and if HEL threshold has not been exceeded by the HEL calculation, then maintaining full activation of the ECB, otherwise initiate a shutoff routine to shutoff the ECB.

According to a yet further embodiment of the present invention, there is provided a system containing a computer program product being tangibly stored on a non-transient machine-readable medium and comprising machine-executable instructions. The instructions, when executed on a device, cause the device to perform acts of the method according to the embodiment of the present invention.

BRIEF DESCRIPTION OF THE DRAWINGS

Preferred embodiments of the present invention will now be described, by way of example only, with reference to the following drawings, in which.

DETAILED DESCRIPTION

Figure 1:
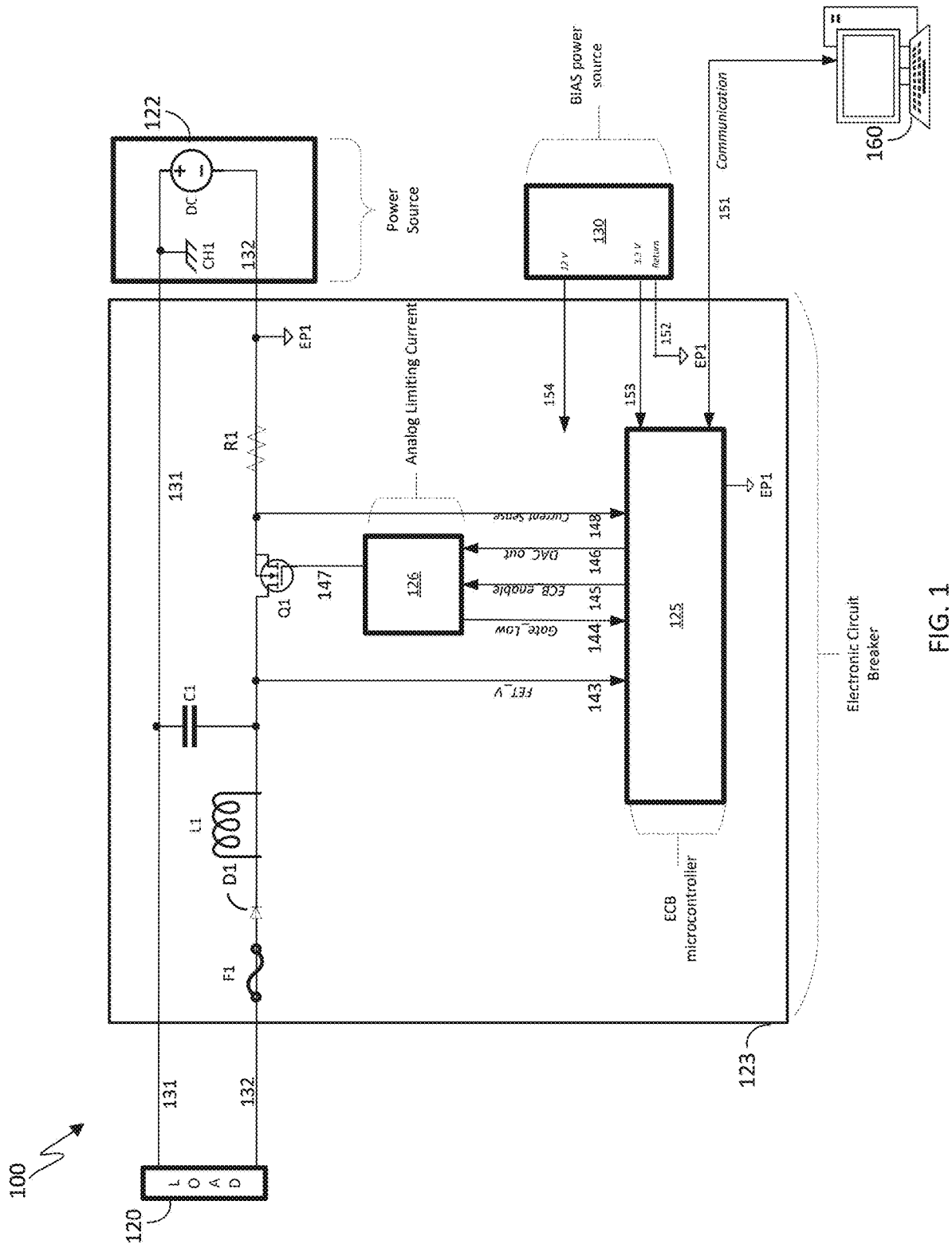
FIG. 1 is a block diagram of ECB (electronic circuit breaker) environment, designated as 100, in accordance with an embodiment of the present invention.

According to an aspect of the invention, there is provided an ECB (electronic circuit breaker) device. The ECB device is coupled to one or more power sources, one or more loads and a host PC. The ECB device may contain one or more microcontrollers, one or more analog limiting current circuits and one or more wiring connections, wherein the one or more wiring connections is coupled to one or more circuit elements, the one or more microcontrollers, the analog limiting current circuit, the one or more power sources, the one or more loads and the host PC, and the one or more circuit elements comprises, one or more MOSFETs (metal oxide field effect transistors), one or more capacitors, one or more resistors, one or more inductors, one or more fuses. As a result, the ECB device can optimize of startup and shutoff current ramp for specific switch and load types as well as mitigate the damaging negative voltages due to inductive "kick" at shutoff. Also, because of concurrent energy monitoring optimized for the MOSFET operating mode during startup, pre-charge circuit is no longer needed. Furthermore, multiple overcurrent thresholds and energy limits allows for optimization of energy control during ECB operation.

In embodiments, the ECB device includes the one or more wiring connections. The one or more wiring connections are coupled to one or more heatsink thermal sensors, in the one or more heatsink thermal sensors comprises of a thermistor or other type of thermal sensor.

In embodiments, the ECB device includes a plug detect wire from the one or more wiring connections to detect a presence of the one or more wiring connections.

In embodiments, the ECB device includes a wire coupled to one or more RC (resistor capacitor) filters, wherein the one or more RC filters incoming current of the one or more loads from the one or more wiring connections.

In embodiments, the ECB device includes, the one or more microcontrollers further comprises of at least 8 A/D inputs, at least one DAC output, one or more general purpose I/O (input/output) pins and at least an 8-bit architect.

In embodiments, the one or more analog current limiting circuit of the ECB device includes one or more operation amplifier, transistors, resistors, capacitors, and diodes.

In embodiments, the ECB device includes a current sense wire from the one or more wiring connections to detect a presence of current from the one or more wiring connections.

According to an aspect of the invention, there is provided a method for power distribution at high voltage, leveraging an electronic circuit breaker (ECB) controlled by a microcontroller. The microcontroller is configured to execute the method by program instructions, such as, at startup, incrementally increase a microcontroller output of an ECB from an initial current to a current limit (CL) threshold. Other aspect of the method includes, performing low energy limit (LEL) calculations based on current and voltage readings and a Gate_Low input, if the LEL threshold has not been exceeded, then the ECB is fully activated, otherwise a shutoff routine is initiated to shutoff the ECB and during operation, perform the high energy limit (HEL) calculations based on the Gate_Low input and the current and voltage reading, and if the current exceeds an OC (over-current) threshold that is below a CL (current limit) threshold, then perform higher energy limit (HEL) calculations, and if HEL threshold has not been exceeded by the HEL calculation, then maintaining full activation of the ECB, otherwise initiate a shutoff routine to shutoff the ECB. As a result, the ECB device is able to optimize of startup and shutoff current ramp for specific switch and load types as well as mitigate the damaging negative voltages due to inductive "kick" at shutoff. Also, because of concurrent energy monitoring optimized for the MOSFET operating mode during startup, pre-charge circuit is no longer needed. Furthermore, multiple overcurrent thresholds and energy limits allows for optimization of energy control during ECB operation.

In embodiments, relating to the above method, the LEL and the HEL calculations can be derived from EL formula, "Energy=Voltage*Current*Time," the voltage is equal to (Voltage LSBs*voltage sensor gain in Voltage/LSB), and current is equal to Current LSBs*current sensor gain in Amperage/LSB), Time is equal to sample time in seconds and LSB denotes least significant bit.

In embodiments, relating to the above method, the LEL threshold, the CL threshold, the OC threshold and the HEL threshold are user configurable and predetermined and the LEL threshold and HEL threshold can be derived from a EL threshold formula, "EL threshold=Voltage LSB*Current LSB".

In embodiments, relating to the above method, the method of incrementally increasing the current limit value is by increasing the DAC output of the microcontroller.

In embodiments, relating to the above method, the method relating to the current and voltage readings are determined by values from a FET_V input and a Current Sense input into the microcontroller.

In embodiments, relating to the above method, the method relating to the Gate_Low input is an input from an ACLC (Analog Current Limiting Circuit) coupled to the MOSFETs that signifies a status of the MOSFET.

According to an aspect of the invention, there is provided a system for power distribution in a high voltage situation. This system includes the following elements, an ECB, a power source, a bias power source, a cabling bundle, a load, a host computer. There are one or more computer processors belonging to the ECB and there are one or more computer readable storage media having computer-readable program instructions stored on the one or more computer readable storage media for execution by at least one of the one or more computer processors belonging to the ECB. The program instructions execute a method comprising the steps of, such as, at startup, incrementally increase a microcontroller output of an ECB from an initial current to a current limit (CL) threshold. Other aspect of the method includes, performing low energy limit (LEL) calculations based on current and voltage readings and a Gate_Low input, and if the LEL threshold has not been exceeded, then the ECB is fully activated, otherwise a shutoff routine is initiated to shutoff the ECB and during operation, perform the high energy limit (HEL) calculations based on the Gate_Low input and the current and voltage reading, and, if the current exceeds an OC (over-current) threshold that is below a CL (current limit) threshold, then perform higher energy limit (HEL) calculations, and if HEL threshold has not been exceeded by the HEL calculation, then maintaining full activation of the ECB, otherwise initiate a shutoff routine to shutoff the ECB. As a result, the ECB device is able to optimize of startup and shutoff current ramp for specific switch and load types as well as mitigate the damaging negative voltages due to inductive "kick" at shutoff. Also, because of concurrent energy monitoring optimized for the MOSFET operating mode during startup, pre-charge circuit is no longer needed. Furthermore, multiple overcurrent thresholds and energy limits allows for optimization of energy control during ECB operation.

In embodiments, relating to the above system, the LEL and the HEL calculations can be derived from EL formula, "Energy=Voltage*Current*Time", the voltage is equal to (Voltage LSBs*voltage sensor gain in Voltage/LSB), and current is equal to Current LSBs*current sensor gain in Amperage/LSB), Time is equal to sample time in seconds and LSB denotes least significant bit.

In embodiments, relating to the above system, the LEL threshold, the CL threshold, the OC threshold, and the HEL threshold are user configurable and predetermined and the LEL threshold and HEL threshold can be derived from a EL threshold formula, "EL threshold=Voltage LSB*Current LSB".

In embodiments, relating to the above system, the method of incrementally increasing the current limit value is by increasing the DAC output of the microcontroller.

In embodiments, relating to the above system, the method relating to the current and voltage readings are determined by values from a FET_V input and a Current Sense input into the microcontroller.

In embodiments, relating to the above system, the method relating to the Gate_Low input is an input from an ACLC (Analog Current Limiting Circuit) coupled to the MOSFETs that signifies a status of the MOSFET.

Challenges with Current Technology

According to one or more embodiments of the present invention, there are challenges relating to controlling power dissipation with respect to electronic circuit breaker. Current methods, such as, a soft start method, does not address all the challenges related to switching devices. The following challenges with the current state of art, can include but is not limited to, i) lacking self-protection of switching device during startup, ii) lacking self-protection of switching device during overloads, iii) poor ride-through performance, iv) increased stress to electrical components, v) support only one type of switching devices (MOSFETS), systems, voltages and configurations and vi) lack of diagnostic features and tools for easier maintenance and/or troubleshooting by users.

One embodiment of the present invention provides an approach to overcome these challenges and address the deficiencies of the prior art. One approach employs a microcontroller to directly control startup current, which facilitates optimization of startup and shutoff current ramp for specific switch and load types as well as mitigate the damaging negative voltages due to inductive "kick" at shutoff. Also, because of concurrent energy monitoring optimized for the MOSFET operating mode during startup, pre-charge circuit is no longer needed. Furthermore, multiple overcurrent thresholds and energy limits allows for optimization of energy control during ECB operation.

For example, the present embodiments (e.g., ECB one 100 and ECB two 200) can adequately address the six challenges presented in an earlier paragraph. Regarding the following, point (i), the embodiment has improvement of self-protection of the switching device (MOSFET) during startup, ii) the embodiment has improved self-protection of the switching device (MOSFET) during overloads and short circuits, iii) the embodiment has improved ride-through during unusual conditions (like overloads or supply voltage dips) that would otherwise cause the ECB to trip, iv) the embodiment can reduced component stress during turn-off by ramping down the current limit to avoid negative voltages on control signals, v) the embodiment can use programmable, downloadable, thresholds and parameters to achieve flexibility with deployment on various platforms to handle varying voltages and different loads, and vi) the embodiment has better diagnostic tools and enhancement for a better user experience.

References in the specification to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments, whether or not explicitly described.

It should be understood that the Figures are merely schematic and are not drawn to scale. It should also be understood that the same reference numerals are used throughout the Figures to indicate the same or similar parts.

Terminology

The term "SCB" (static circuit breaker) may be found in the description and figure. This term has the same meaning as "ECB" (electronic circuit breaker). ECB and/or SCB is intended to describe ECB 123 of FIG. 1.

LSB is a term understood to mean Least Significant Bit (smallest signal value that can be represented). For example, for an 8-bit DAC, that's 256 LSBs.

Over-Current (OC) Threshold is a user defined/predetermined and adjustable value threshold used when a certain activity has occurred. For example, if the current exceeds this threshold value, the MOSFET energy is continuously calculated and compared to the High Energy Limit (HEL).

High Energy Limit (HEL) is a user defined/predetermined and adjustable value threshold used when a certain activity has occurred. For example, when current exceeds the OC threshold and the energy in the MOSFET exceeds the HEL, the MOSFET is disabled to protect it from damage.

Current Limit (CL) Threshold is a user defined/predetermined and adjustable value threshold used when a certain activity has occurred. For example, when the current limit threshold is higher than the OC threshold. If the loading would exceed this threshold value, the analog control circuitry forces the MOSFET to limit the current to the CL threshold. As a result of the current limiting, the output voltage is reduced. The MOSFET energy is continuously calculated and compared to the Low Energy Limit (LEL).

Low Energy Limit (LEL) is a user defined/predetermined and adjustable value threshold used when a certain activity has occurred. For example, when current limiting, if the LEL is exceeded, the MOSFET is disabled to protect it from damage. The LEL is lower than the HEL because the MOSFET has increased stresses during current limiting.

Gate Low Threshold is a user defined/predetermined and adjustable value threshold used when a certain activity has occurred. For example, when the Gate_Low signal is below this threshold, the MOSFET is in current limit mode. Different MOSFET part numbers may have different gate low thresholds.

EL (Energy) Limit thresholds are thresholds used to set a maximum or minimum energy level (measured in Joules) that the ECB system can operate in a normal state (i.e., without damage and/or issues), this can include LEL (Low Energy Limit) or HEL (High Energy Limit) threshold.

The thresholds described in the preceding paragraphs can be further summarized by the below table.

TABLE 1

| Mode | Current |
| --- | --- |
| Current Limiting | If load would exceed CL threshold, then current is limited to this threshold. The ECB measures energy and shuts off if LEL is exceeded. |
| Over current | If current exceeds the OC Threshold, the ECB measures energy and shuts off if HEL is exceeded |
| Normal Operating Range | The current is between 0 and the OC Threshold |

FIGURES

The present invention will now be described in detail with reference to the Figures.

FIG. 1 is a block diagram of ECB (electronic circuit breaker) one environment, designated as 100, in accordance with an embodiment of the present invention.

ECB One—High Level Description

ECB one environment 100 contains the following main components, load 120, ECB 123, source 122, bias power source 130 and host computer 160. 120 Load is an electrical load. This load can have varying voltage, depending on the application of the user. Power source 122 is a voltage source that is connected to the load (120) and being switched on or off by ECB 123. Power source 122 contains a DC power source, such as, a 250 V DC source and chassis ground CH1.

Wire one 131 and wire two 132 are used to connect power source 122 to ECB 123 and Load 120. Wire one 131 and wire two 132 are used to connect to base on the polarity of various electrical devices within ECB one environment 100 or ECB two environment 200.

ECB 123 is a device whose main function is, i) to connect and ii) disconnect a power source to a load. The ECB protects that source from overloads, particularly short circuits, that might occur in the load. The ECB also protects itself from being damaged by unusual conditions in the source or load. At low voltage (i.e., 12 V), various component manufacturers provide integrated circuits typically called "e-fuses" which provide an electronic circuit breaker function. However, unlike e-fuse, ECB is capable of handling higher voltages, such as 350 V or greater. ECB 123, including all internal components, will be described in further detail later.

Bias power source 130 is a bias power source for ECB microcontroller 125 and Analog Current Limiting Circuit 126. This bias power source allows for, but not limited to, debugging and diagnostic purpose.

Wire 152 provides a common ground reference for bias power source. It is noted that EPI also provides a common grounding point for ECB microcontroller 125 and wire two 132. Wire 153 and Wire 154 provides 3.3 Volt and 12 Volt of bias power to ECB microcontroller 125, respectively.

Communication cable 151 provides communication connectivity between ECB microcontroller 125 and host computer 160. Any existing communication protocol may be utilized (e.g., UART, I2C, etc.).

Host computer 160 (optional) is a computerized device capable of, but not limited to, programming, debugging, implementing a set of instructions for ECB microcontroller 125 to execute. The computerized device can be, but is not limited to, smartphone, a laptop, server and cloud computing that offers the above functionality. The ECB can operate entirely independent of the host. The host provides optional high-level control and diagnostic reporting.

ECB One—Internal Description of 123

ECB 123 is an electronic device containing several components (e.g., analog current limiting circuit 126, ECB microcontroller 125, resister R1, inductor L1, capacitor C1, diode DI, transistor Q1, fuse F1, grounding point EPI etc.). ECB 123 is coupled to power source 122, Load 120, bias power source 130 and host computer 160.

Within ECB 123, there are various electrical elements such as, resisters, diodes, inductor, transistors, and capacitors residing inside. These electrical elements, the values (e.g., resistance in Ohms, capacitance in Farads, etc.) chosen is dependent on, the load, voltage source and/or other user requirements. Thus, no guidance will be given to the range for these simple electrical elements. However, transistor Q1 is a N-channel MOSFET type of transistor.

Therefore, the detail description of ECB 123 will focus on the major components and their arrangement within 123, such as ECB microcontroller 125, ACLC (analog current limiting circuit) 126 and wirings connection (e.g., 143, 144, 145, 146, 147, 148, 49, 150, etc.) between those components.

ACLC (Analog current limiting circuit) 126 is essentially a circuit that is well known in the art for restricting the flow of current through specific component or loads. Analog current limiting circuit may contain, but it is not limited to, one or more operation amplifiers, transistors, resistors, capacitors, and diodes. However, ALCC 126 utilizes analog devices instead of relying on digital components to limit and/or regulate current flow.

ECB microcontroller 125 is a microcontroller. A microcontroller is essentially a small computer on a single integrated circuit. Any off-the-shelf microcontroller can be used but should have the following I/O (input/output) features: i) 8 or more A/D (analog to digital) inputs, ii) 1 or more DAC (digital to analog) output and iii) several "General Purpose" I/O pins. Other features of the microcontroller should include, at least an 8-bit architecture and an A/D (analog-to-digital) converter, small size and low power may be preferred in the application but are not required for functionality. It is noted that the present embodiment is agnostic to brand and/or model for an ECB microcontroller.

F1 is a fuse for backup protection in case of overload and circuit failure. Chassis ground CH1 and ground EPI are both points for grounding the chassis (i.e., conducting material that houses of ECB switching device) and common circuit reference point, respectively.

Wiring Connection Inside 123

The operations and/or "modes" of these inputs and outputs will be further described in detail in the METHOD and/or PROCESS FLOW section.

ECB inputs 143 and 148 are wire connections into ECB microcontroller 125 that allow for the microcontroller to sense the MOSFET (i.e., Q1) voltage and current. This input is sometimes referred to as "FET_V." and "current sense". These inputs allow for the MOSFET energy calculation. For example, the 10-bit A/D for detecting voltage and current may read 307.2 V @ 2.5 V, 0.3V/LSB for the voltage and read 25.6 A @ 2.5V, 25 mA/LSB for the current.

The energy calculation is based on the sensed MOSFET voltage FET_V (i.e., ECB input 143) and current (i.e., ECB 148) at a certain interval (e.g., precisely every 14 us, 10 us, etc.). It is noted that Q1, a MOSFET, is shown as one single device and this is for illustration purpose only. In other embodiments, there can be more than one MOSFET device, such as, Q2, Q3 . . . . Qn (depending on the application requirement).

ECB input 144 (also known as, "Gate_Low" input) is a wire connection into ECB microcontroller 125 that indicates that the MOSFET gate voltage is lower than when it's fully enhanced (via ACLC 126).

ECB output 145 (also known as, "ECB_enable" output) is a digital output to pull up or pull down the MOSFET gate.

ECB output 146 (also known as, "DAC_out" output) is the analog output from the DAC for soft-start and current limit setting. It is noted that "DAC" refers to Digital-Analog-Converter. This output may perform other function, such as soft start and soft stops. For example, an 8-bit DAC may be 32 A full scale (i.e., 125 mA/LSB).

ECB comm input 151 or is previously referred to as "communication cable 151" (i.e., communication) allows for communication between ECB microcontroller 125 and host computer 160. Any protocols may be utilized, including UART (Universal Asynchronous Receiver/Transmitter).

ECB input 153 or previously referred to as wire 153 (i.e., 3.3 V power bias) is used for microcontroller logic and derivation of 2.5 V analog reference for the A/D.

ECB input 154 or previously referred to as wire 154 (i.e., 12 V power bias) is used for SCB enable, disable, and current limiting functions.

Figure 2:
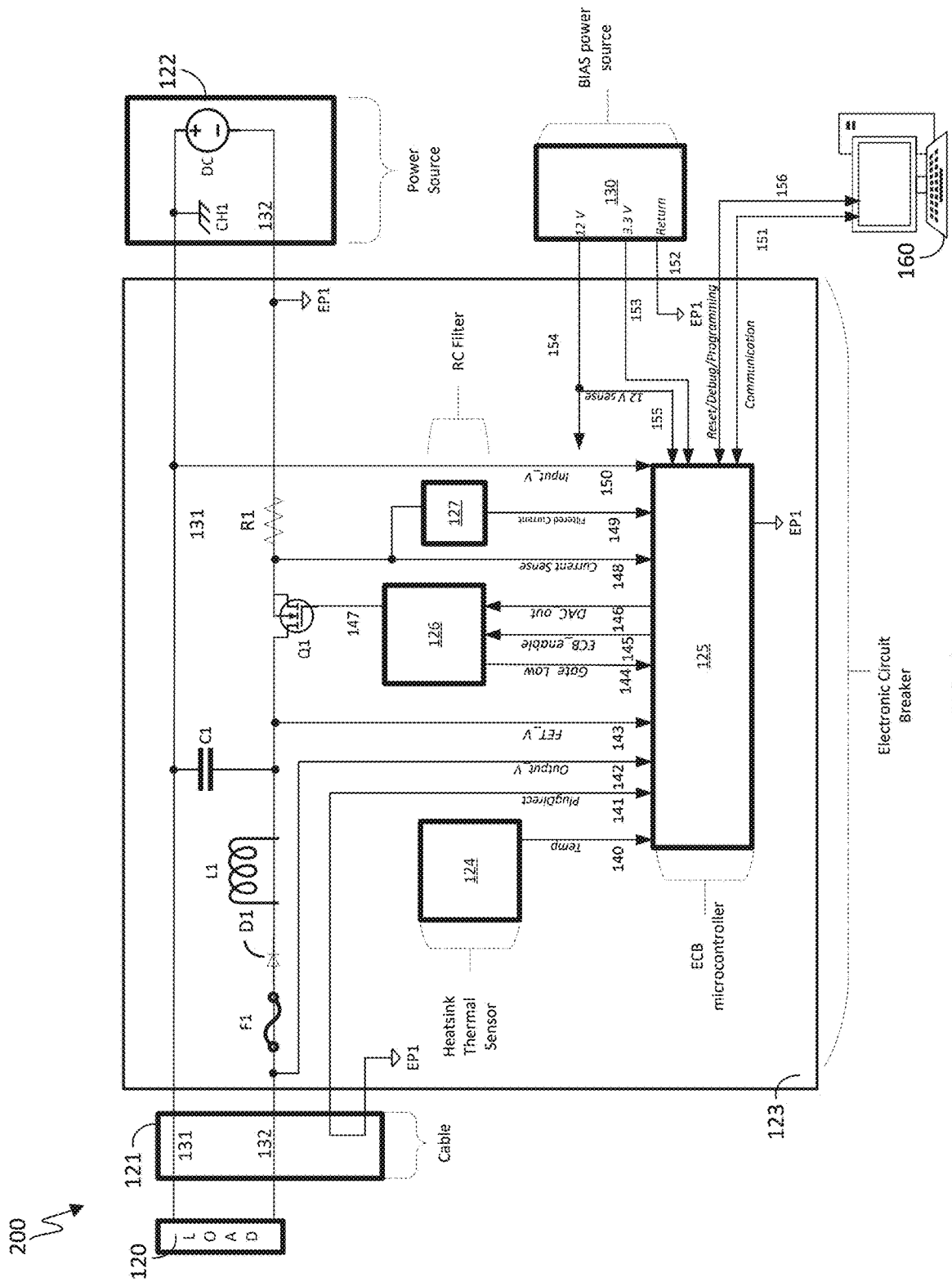
FIG. 2 is a block diagram of electronic circuit breaker two environment, designated as 200, in accordance with another embodiment of the present invention.

FIG. 2 is a block diagram of ECB two environment, designated as 200, in accordance with another embodiment of the present invention. Both, ECB one and ECB two share basic and common design and features. However, ECB two has enhance features and components over ECB one.

Differences between ECB one and ECB two will be highlighted below. Essentially, there are additional wiring and more devices within ECB two that allows for greater flexibility, diagnostic and ease of use. It is noted that FIG. 2, (ECB two), is the preferred embodiment of the present invention.

Features and Enhancements of ECB Two

The features and enhancements of ECB two over ECB one can be summarized by the following lists below:

A/D based telemetry for current and voltages.

Fully customizable digital thresholds.

Input voltage out of spec diagnostic indication:

By sensing input voltage, the ECB microcontroller can detect and report input voltage that is too high or too low.

Input voltage PLD detection:
  Interruptions in power delivery to the load can be caused by input voltage brown-outs caused by Power Line Disturbances. The ECB can identify and report PLD events using Input Voltage sensing.

Load protected from input 0V (via firmware disable):
  If the input voltage exceeds a potentially damaging threshold, the ECB microcontroller can disable the MOSFET to protect the load.

Input under-voltage lock out (UVLO):
  The load may function incorrectly if the input voltage falls below a certain value. In this case, the ECB microcontroller can disable the MOSFET for under-voltage.

Fuse open or high resistance diagnostic:
  Using output voltage and MOSFET voltage sensors, the ECB micro can determine if the fuse is open or at a high resistance.

Detection of on/off state mismatch between redundant ECBs:
  The ECBs can be used in parallel for redundancy. Because of the diode in the ECB circuit, the output voltage sensor indicates the load voltage rather than the MOSFET voltage. If the MOSFET voltage is high and the output voltage is low, then the load has been enabled by the parallel ECB even though this ECB is disabled.

Snooping output voltage allows ECBs to start in parallel without synchronized commands:
  ECBs can be used in parallel for redundancy. Enabling parallel ECBs at the same time allows them to share startup current and minimize MOSFET stresses. But it may not be possible for the ECBs to be given simultaneous enable commands. Instead, the ECB microcontroller can use the output voltage sensor to detect when it's partner ECB has initiated start-up. The ECB can then begin its own start-up.

Bias voltage UVLO:
  Using the 12V sense signal, the ECB micro can detect a low bias voltage. The MOSFET is disabled to avoid failures that could occur during these conditions.

Auto-start/power fault recovery:
  If desired, the ECB microcontroller can be programmed to automatically enable the MOSFET when input voltage is applied initially or returns after an interruption.

Digital filtering of threshold excursions adds noise immunity and filters transients:
  All sensor values are digitized by the ECB microcontroller. Robustness is added by digitally filtering these values.

A/D readings allow distinction between insane sensor readings and load/source faults:
  Sensors that indicate some impossible values are discounted and reported as faulty. Each sensor has programmable "valid" and "insane" ranges.

Filtered current sense:
  A resistor and capacitor filter provides an average current reading in addition to the instantaneous current sensor. The load on an ECB is most likely a switching power supply. Such a load typically has significant input current ripple. The filtered current sensor is nearly free and provides average current reading suitable for telemetry and average power calculations.

Using the Plug_Detect signal, the microcontroller can sense the presence of a load cable.
  If the cable is unplugged, the ECB microcontroller disables the ECB output. This minimizes arcing that can happen when a higher voltage DC circuit is disconnected.

MOSFET diagnostics (e.g., leaky, shorted, high resistance):
  Using the MOSFET voltage and current sensors when the ECB is enabled, the ECB microcontroller can measure MOSFET resistance. Resistance too low indicates a shorted MOSFET. Resistance too high could cause high power dissipation and heat. When the ECB is disabled, a leaky MOSFET is indicated by lower MOSFET voltage.

Enable staggering avoids inrush:
  When starting up, each ECB in a system can use a programmable delay before enabling the MOSFET. If each ECB is programmed with a different delay, none of the ECBs power on simultaneously. This avoids excessive current draw from the source.

Customized thermal sensing adds protection from additional faults:
  The addition of a low-cost thermistor or other thermal sensor protects the ECB from fan failures, high environmental temperatures, and clogged airflow. Our ECB uses a custom designed thermal sensor that helps provide mounting and electrical isolation from high voltages.

ECB Two—High Level Device Description

ECB two 200 contains the following elements and/or devices that are not found in ECB one 100, cable 121, heatsink thermal sensors 124, 140, 141, 142, RC filter 127, 149, 150 155 and 156.

Some of the advantages of ECB Two over ECB one, may include the following, but is not limited to, i) plug detect is wrapped through cable minimizes arcing during hot unplug, ii) MOSFET diagnostics (e.g., leaky, shorted, high resistance), iii) enable staggering avoids inrush, iv) snooping output voltage allows ECBs to start in parallel without synchronized commands, v) customized current limits minimize fault energy requirements improving system efficiency and sustainability and vi) customized thermal sensing adds protection from additional faults. These advantages will be explained later.

Cable 121 denotes an optional cable connection from microcontroller-based ECB (i.e., 125) to the Load (i.e., 120) via an output connector/plug. Furthermore, when it is plugged, the attached cable wraps a signal back to the ECB microcontroller, which disables the ECB when no plug is detected.

Heatsink thermal sensors 124 is a device that can help protect ECB 123 (or ECB one and/or ECB two) from additional faults relating to high temperature. High temperatures can be caused by various factors, such as, clogged airflow and fan failures. Heatsink thermal sensors 124 can be a low-cost thermistor or thermal sensors. The preferred embodiment utilizes a thermistor instead of thermal sensor. The thermistor is encased in a custom plastic mounting to a heatsink. This preferred embodiment has an advantage of providing mounting and electrical isolation from high voltages. ECB input 140 is coupled to heatsink thermal sensor 124 to provide an input to ECB microcontroller 125.

ECB input 141 (also known as, "plug_direct") is an input used to detect a load cable. ECB microcontroller 125 can utilize this signal to disable the ECB output (if the cable is unplugged). This feature allows the chance of arcing (i.e., a higher DC voltage circuit is disconnected) during hot unplugging.

ECB input 142 (also known as "output_voltage") is one of two inputs that allows ECB microcontroller 125 to detect if the fuse (F1) is open or at a high resistance. The other inputs, ECB input 143 (i.e., "FET_V").

RC (resister and capacitor) filter 127 provides an average current reading in addition to the instantaneous current sensor. The load on an ECB is most likely a switching power supply. Such a load typically has significant input current ripple. The filtered current sensor is nearly free and provides average current reading suitable for telemetry and average power calculations. ECB input 149 (also known as "filtered current") is coupled to RC filter 127 and is an input into ECB microcontroller 125.

ECB input 150 (also known as "input voltage") is used (as diagnostic indication) to determine if the input voltage is out of specifications. By sensing input voltage, the ECB microcontroller can detect and report input voltage that is either too high or too low. There are several advantages of having this diagnostic indicator:

Input Voltage PLD Detection
  Interruptions in power delivery to the load can be caused by input voltage brown-outs caused by Power Line Disturbances. The ECB can identify and report PLD events using Input Voltage sensing.
Load Protected from Input 0V (Via Firmware Disable)
  If the input voltage exceeds a potentially damaging threshold, the ECB microcontroller can disable the MOSFET to protect the load.
Input Under-Voltage Lock Out (UVLO)
  The load may function incorrectly if the input voltage falls below a certain value. In this case, the ECB microcontroller can disable the MOSFET for under-voltage.
Auto-Start/Power Fault Recovery
  If desired, the ECB microcontroller can be programmed to automatically enable the MOSFET when input voltage is applied initially or returns after an interruption.

ECB input 155 (12v sense) is an input that ECB can detect a low bias voltage. This input facilitates Under-Voltage Lock Out (UVLO). With UVLO, The MOSFET is disabled to avoid failures that could occur with inadequate bias voltage.

ECB comm input 156 allows for additional communication between ECB microcontroller 125 and host computer 160 (reset/debug/programming signals). This can allow for other functionality (depending on the type of ECB microcontroller), such as, but not limited to, resetting, testing, debugging, or reprogramming the ECB microcontroller. The advantage of this input provides an in-system reprogramming of the entire ECB microcontroller provides superior flexibility to the ECB.

ECB input 143 is a wire connection into ECB microcontroller 125 that allows for the microcontroller to sense the MOSFET voltage (i.e., Q1). This input is sometimes referred to "FET_V." This input allows for the MOSFET energy calculation. The energy calculation is based on the sensed MOSFET voltage FET_V (i.e., ECB input 143) and current at a certain interval (e.g., precisely every 14 us, 10 us, etc.).

ECB input 144 (also known as, "Gate_Low" input) is a wire connection into ECB microcontroller 125 that indicates that the MOSFET gate voltage is lower than when it's fully enhanced (via ACLC 126).

ECB output 145 (also known as, "ECB_enable" output) is a digital output to pull up or pull down the MOSFET gate.

Modes of Operation for ECB

This section explains the basic operational modes of ECB one 100 and ECB two 200.

When enabled, the current through the ECB is controlled directly. The microcontroller provides an analog output that is proportional to the maximum current allowed through the MOSFET (i.e., Q1). The analog output voltage is derived from a DAC, the signal is named "DAC_out" (i.e., ECB output 146). To minimize peak power dissipated in the MOSFET, DAC_out is ramped up from 0. The ECB has a small amount of analog circuitry that controls the MOSFET in such a way that the current through the MOSFET matches the DAC_out voltage. Once fully enabled, the MOSFET is fully enhanced (e.g., conducting current, etc.).

Normal operation: The current and MOSFET voltage are monitored. As long as the current is below the "over-current threshold", no further actions are taken.

Over-current: If the current exceeds the over current threshold, the micro-controller uses the current and voltage sensing (along with a timer to measure time) to calculate energy in the MOSFET. This energy calculation is compared to the "High Energy Limit" (HEL). If the HEL is exceeded, the MOSFET is disabled. The HEL can be fairly high since the MOSFET is fully enhanced.

Current-limit: If the current exceeds the current limit threshold set by DAC_out, the analog circuitry forces the MOSFET current to match the DAC_out value. This means the MOSFET's gate voltage is lower than when it is fully enhanced. The Gate_Low signal (i.e., ECB input 144) indicates this to the micro-controller. The microcontroller then calculates the energy in the MOSFET and compares it to the "Low Energy Limit" if the LEL is exceeded, the MOSFET is disabled. The LEL is lower because the power dissipation in the MOSFET is high.

Shut-off: when shut off for protection or by host command, the micro-controller ramps down the DAC_out signal. This causes the analog circuitry to decrease the current through the MOSFET in a controlled manner. This avoids negative voltages on signals caused by the "inductive kick" which occurs when current through an inductance is suddenly interrupted.

Programmability: All thresholds and key parameters are stored in the micro-controller but can be updated by the host. This allows flexibility, personalization, and optimization for different systems, power levels, and components used.

Telemetry: The fault indications, sensor states, and energy calculations are stored and can be reported to the host computer.

Operation Flowchart

Figure 3:
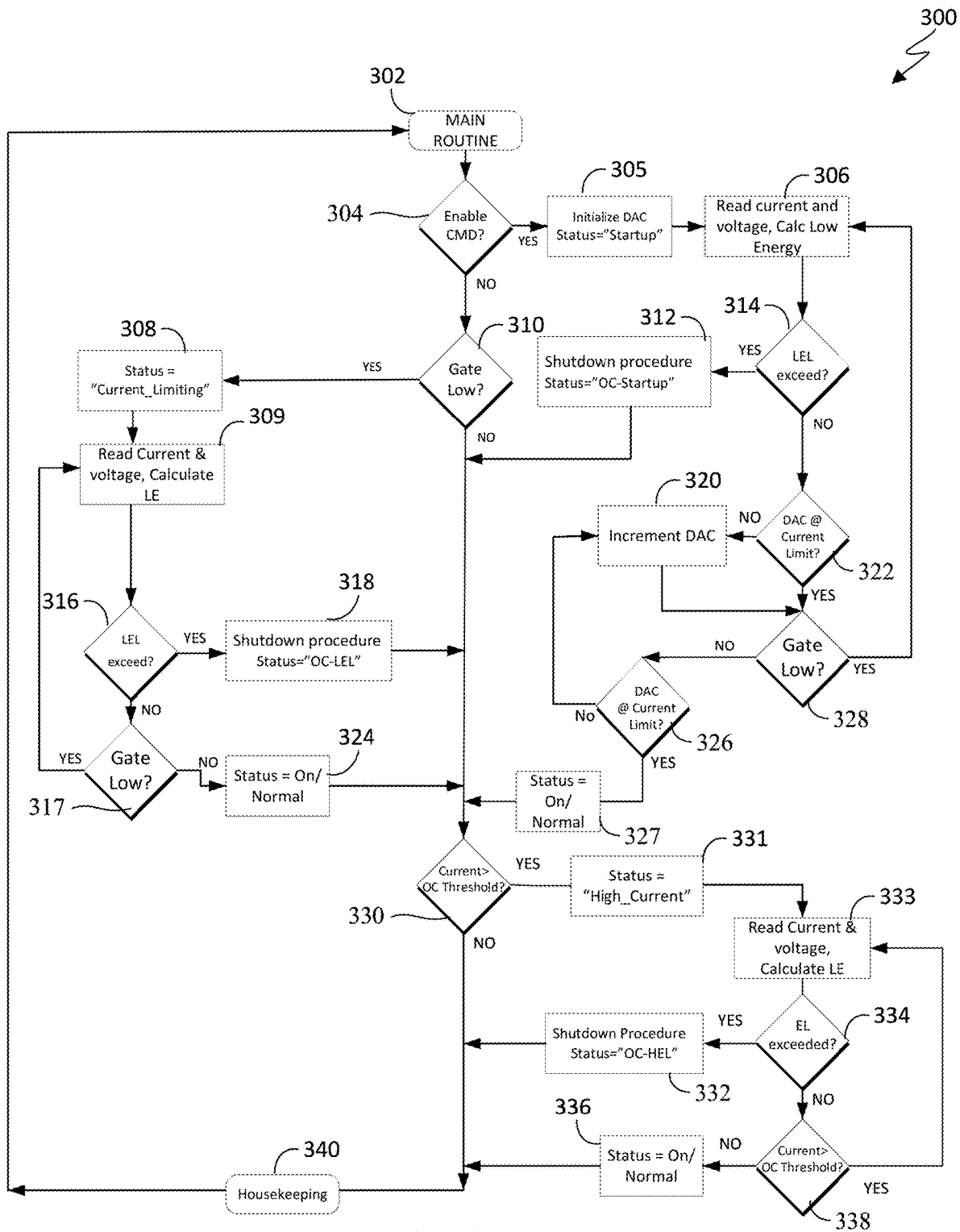
FIG. 3 is a high-level flowchart illustrating a process of using electronic circuit breaker 123 and connected devices, designated as 300, in accordance with an embodiment of the present invention.

FIG. 3 is a high-level flowchart illustrating a process of using ECB one or ECB two, designated as 300, in accordance with an embodiment of the present invention.

There are a few thresholds that are discussed in the flowchart. These thresholds are selectable and adjustable by the user based on the unique requirements of the specific application. EL (Energy Limit) thresholds are thresholds used to set a maximum or minimum energy level (measured in Joules) that the ECB system can operate in a normal state (i.e., without damage and/or issues), this can include LEL or HEL threshold. Please refer to the DEFINITION section on the meaning of the various thresholds.

It is noted that other actions of the act performed by the microcontroller can include, but is not limited to, i) setting the current limit via the DAC, ii) powering down the ECB, iii) incrementing DAC, iv) read current and voltage, v) perform EL calculations (LEL and HEL), vi) decrementing the DAC and vii) performing housekeeping duties.

The microcontroller used to illustrate the step contains a DAC with 8-bit (or more) resolution and an A/D with 10-bit (or more) resolution.

There are at least three main "loops" from the flow chart. The first loop, "Normal," would denote routine procedure. The Normal loop would include the following steps, 305, 306, 312, 314, 320, 322, 328, 326 and 327. The second loop, "Over Current," would denote procedure dealing with a high current situation. The "Over Current" loop would include the following steps, 330, 331, 332, 333, 334, 336 and 338. The third loop, "Current Limiting" would denote procedure dealing with a low energy limit situation. The "Current Limiting" loop would include the following steps, 308, 309, 310, 316, 317, 318 and 324.

Normal Loop

Step 302 denotes a "main" routine to continuously provide protection and control. It is noted that the main routine must run when ECB 123 is in the ON state.

Decision block 304 is a decision step to determine whether the ECB has received an "enable command" to the microcontroller (i.e., 125) from a host computer (i.e., 160). Once an "enable command" has been received by the microcontroller and other inputs are detected, such as, plug connection, a good and clean 12 V and 3.3 V bias voltage then step 306 commences. Otherwise, the ECB determines whether the ECB is now enabled, and the "Gate Low" signal is high or low (decision block 310).

Step 305 initiates the startup routine by first initializing the current limit. Note that the current limit is controlled by the DAC. During startup, the current limit is initialized to 0, or in some cases circuit offsets may make it advantageous to initialize the DAC to some small value typically less than an amp. The ECB_Enable line is set to the "enable" state, allowing the analog current limiting circuit to force the current through the MOSFET to equal the current limit value established by the DAC. Note that the current limit value will be ramped upward in a subsequent step (i.e., step 320).

Furthermore, with step 305, there is an update to a status indicator (e.g., for diagnostic function, etc.) of ECB 123 to let the user/operator know that ECB 123 is set to "Startup".

Step 306 involves the process of, i) reading the current and voltage and ii) calculating LEL (low energy level).

Generally, LEL or HEL calculation can be derived by the following formula:

$$\text{Energy} = \text{Voltage} * \text{Current} * \text{time};$$

That is, $(\text{Voltage } LSBs * \text{voltage sensor gain in } V/LSB) *$ $(\text{Current } LSBs * \text{current sensor gain in } A/LSB) *$ $\text{sample time in seconds} = \text{Energy in } J$ Since sample time is constant, the energy limit can be divided by the known sample time. The energy limit can then be compared to the voltage*current product. This avoids the computational burden associated with real-time floating-point calculations. Similarly, the sensor gains are known, so the energy limit can be divided by these factors as well.

So, $EL$ threshold =

$\text{Voltage } LSBs * \text{Current } LSBs = EL$ in $J/(\text{voltage sensor gain in}$ $V/LSB * \text{current sensor gain in } A/LSB * \text{sample time in seconds})$ However, the calculation is a snapshot at a particular interval in time. However, for comparison purpose at the decision blocks (e.g., decision block 314, 316 or 334, etc.), the values of the calculation must be cumulative. Thus, the cumulative energy from all time intervals is used to compare against the LEL or HEL threshold, for example, "Energy=previous Energy+(Voltage*Current)."

Additionally, there are some examples (further below in decision block 328 and decision block 330), including derived LEL or HEL formulas that may be used throughout this flowchart, but these contain specific values. It should be noted that the above formula should be used instead as a guidance for someone well known in the art. Furthermore, LEL and/or HEL calculation must be repeated at certain intervals, for example, every 14 µs. Decision block 314 involves the process of determining whether the energy level threshold has been exceeded by ECB 123. If the energy limit has been exceeded, then the DAC is ramped down to zero as part of step 312. For example, step 312 can include the current limit (DAC) and can be ramped down in 20 us and the ECB 123 status can be changed to "OC-Startup."

Decision block 322 and decision block 326 involves the process of determining whether the DAC has exceeded the current limit. It is noted that MOSFET energy calculation is based on the sensed MOSFET voltage FET_V and current at a precise time interval. For example, if the LEL is reached, the shutoff routine is initiated, otherwise the DAC current continues to be incremented as shown in step 320 until it reaches the current limit threshold.

Step 320: As the ECB microcontroller loops through the flowchart, it will periodically execute block/step 320 which increments the current limit value. Thus, the current through the MOSFET ramps upward from 0. The current limit value continues to increase until the current limit threshold is reached in block 326. The time between successive executions of block/step 320 determines the rate at which the current limit rises. A timer in the ECB microcontroller can be used to control and optimize the ramp rate for the particular application. Ramping the current upward during startup reduces the stresses in the MOSFET compared to other startup methods such as constant current. Directly controlling the current allows for improved precision and flexibility during startup.

Decision block 328 (similarly, decision block 310 and 317) involves the process of determining if the "Gate_Low" signal is below the Gate_Low Threshold. If the current drops before the CL threshold have been reached as indicated by the absence of "Gate_Low" signal, the LEL interrupt and the LEL calculation timer-based interrupt are disabled. Furthermore, the energy value is not immediately reset to zero but decremented periodically until it reaches zero to protect the ECB from back-back events which might damage the ECB.

Once the YES branch of decision block 326 has been achieved, the entire process returns to the main branch (below decision block 310) and status of the ECB is set to "ON/Normal" (step 327).

Current Limiting Loop

Decision block 310 determines whether the ECB is now enabled, and the "Gate_Low" signal is low. It is noted that value of the "Gate low" signal is compared to a "Gate_low"

threshold. If the value of "gate low" signal is below that threshold, then it is deemed that MOSFET is in current limit. Furthermore, if the ECB is enabled and the Gate low signal is present, then step 308 and 309 begins. Otherwise, the process goes on to decision block 330.

Step 308 is a status indicator (e.g., for diagnostic function, etc.) of ECB 123 to let the user/operator know that ECB 123 is set to "Current Limiting".

Step 309 is very similar to step 306 (e.g., reading the current and voltage and calculate LEL) except that the ECB is not in a start-up phase. The Load capacitance causes inrush current, causing the ECB to start in current limit as indicated by "Gate_Low" signal, that is gate voltage below the "Gate_Low Threshold." The "Gate_Low Threshold is programmable, and the appropriate value should be selected for the specific MOSFET used. "Gate_Low" immediately triggers the LEL (Low Energy level) interrupt which in turn enables the timer-based interrupt for LEL calculation in step 306 (similarly in step 309).

Decision block 316 has similar operation to decision block 314. From step 308 and with decision block 316, if it the energy limit has been exceeded then the process proceeds to step 318. Otherwise, the process proceeds to decision block 317. Decision block 317 has similar operation as decision block 328.

Step 318 is similar to step 312 with the exception of the ECB status is set to "OC LEL."

If decision block 317 determines that the Gate_Low signal is present (i.e., below Gate Low threshold), then the process returns to step 309. Otherwise, the process proceeds to step 324.

Step 324 involves the ECB status being updated from "Current Limiting" to "On/Normal".

Over Current Loop

Decision block 330 involves the process of determining whether the current exceeds the OC threshold. If the current does exceed the OC threshold, then the ECB is deemed to be in a "High Current" state (step 331).

Step 331, there is an update to a status indicator (e.g., for diagnostic function, etc.) of ECB 123 to let the user/operator know that ECB 123 is set to "High Current".

The next step (step 333) is to read the current and voltage and calculate the HEL (high energy level). This is similar the steps of 306 and 309. It is noted that the OC threshold is below the CL threshold. HEL calculation is achieved through a similar method as used in LEL calculations, except that the sampling time is longer (i.e., 50 µs,) since the HEL can be significantly higher (e.g., 10×, etc.) than the LEL. As with the LEL calculation, the HEL calculation is facilitated by a timer.

If current drops below the OC threshold, the HEL calculation timer-based interrupt is disabled. Furthermore, the energy value is reset to zero. Below are the pseudo equations relating to the above discussion: The specific numbers used are an example and are not specifically required for proper ECB operation.

Energy = (Voltage $LSBs * 0.3$ volts/$LSB$) *

(Current $LSBs * 0.025$ amps/$LSB$) * 50 $\mu S = 5 J$

Or rewriting: Derived HEL =

Voltage $LSBs$ * Current $LSBs = 5/(0.3 * 0.025 * 50e{-}6)$

Or equivalent to: Derived HEL = 13.3e6 ('$CB7355'$ Hex)

Decision block 334 involves the process of determining whether the energy limit has exceeded the energy limit threshold. If the energy has exceeded the high energy limit threshold, then the ECB will shut-off by ramping down the current-limit (DAC) to zero, as part of step 332. Step 332 is similar to steps 312 and 318.

However, if the energy limit does not exceed the energy limit threshold, then the next step is to determine (decision block 338) whether the current still exceeds the OC threshold.

If the current does exceed the OC threshold, then the ECB goes back to read the current and voltage and recalculate HEL. However, if the current does not exceed the OC threshold, then the ECB resumes normal operation (step 336, i.e., status updated to "On/Normal").

Housekeeping

Step 340 (also known as Housekeeping routines/step) is a step that can be considered as part of an advance diagnostic features. The process described in this invention is based on multiple energy monitoring, therefore, the LEL interrupt in decision block 310 is active throughout the ECB operation and can be enabled or disabled as needed based on the "Gate_Low" signal status as described above for startup routine.

While in normal operation, some housekeeping tasks/duties are done by the microcontroller in step 340, which are periodic decrement of LE (low energy) value, resetting of watchdog timer to ensure programs are not out of control, routine sensor monitoring such as voltage and current readings, communication between the ECB and host as well as advanced diagnostics. It is noted that the LE value is decreased gradually instead of an immediate reset to zero. This prevents the back-back events from damaging the ECB hardware.

The shutoff routine can be initiated if LEL or HEL is reached, or by a shutoff command to the microcontroller via the UART, otherwise the ECB continues normal operation. During shutoff, the buffered microcontroller DAC output is decreased over time from the current limit threshold down to zero. Subsequently, there is a short wait (e.g. 20 µs) for stability before disabling the ECB by pulling high the ECB_enable line.

Alternative Embodiment of Method

Figure 4:
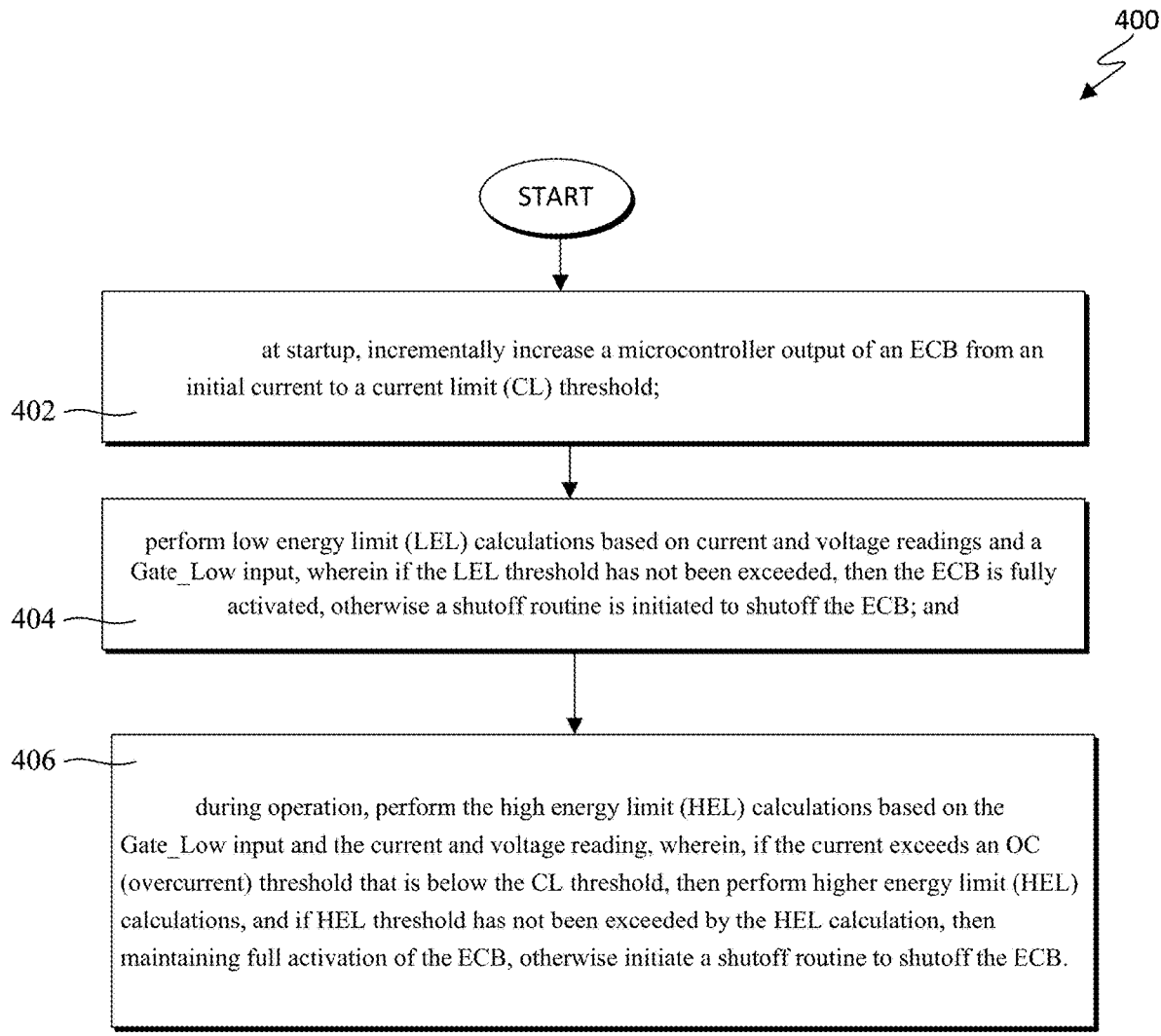
FIG. 4 is a high-level flowchart illustrating a process of using electronic circuit breaker 123, designated as 400, in accordance with an embodiment of the present invention.

In another embodiment of the present invention, the steps of instructions executed by microcontroller 125 can be summarized at a high level as process 400 (see FIG. 4). The thresholds (e.g., CL, OC, LEL, HEL, etc.), microcontroller actions (e.g., set DAC, etc.) and calculations (e.g., energy, etc.) from the FIG. 3 applies to this embodiment method as well.

Step 402 is a step relating to the startup operation of the ECB. For example, at startup, microcontroller 125 incrementally increase a microcontroller output of an ECB from an initial current to a current limit (CL) threshold.

Ramping the current upward during startup reduces the stresses in the MOSFET compared to other startup methods such as constant current. Directly controlling the current allows for improved precision and flexibility during startup.

Upon command, or when the ECB microcontroller otherwise determines that startup should occur, the ECB microcontroller executes the startup routine. This routine validates the following, but is not limited to, i) plug connection is detected, ii) checking that the 3.3 V as well as 12 V supplies are good, iii) the DAC is initialized to 0, iv) the microcontroller sets the digital ECB_Enable signal (i.e. 145) to the "enable" state, and v) a digitally controlled analog voltage is provided by the microcontroller digital-to-analog converter (DAC) output (which increases according to a programmable ramp and stops at the startup current limit (CL) value). The capacitance causes inrush current, which sets the microcontroller comparator register to indicate "Gate_Low", meaning, MOSFET is operating in the linear mode and not fully enhanced. The microcontroller immediately starts interrupt-triggered low energy limit (LEL) calculations based on the sensed current and voltage via the microcontroller's analog-to-digital converter (A/D), where the time is implicit in the sample time of the A/D.

Step 404 is a step that involves LEL calculation. For example, microcontroller 125 performs an interrupt-triggered low energy limit (LEL) calculations based on current and voltage readings. If the LEL threshold has not been exceeded, then the ECB is fully activated. Otherwise, a shutoff routine is initiated to shutoff the ECB.

Generally, LEL or HEL calculation can be derived by the following formula:

$$\text{Energy} = \text{Voltage} * \text{Current} * \text{time};$$

That is, $(\text{Voltage } LSBs * \text{voltage sensor gain in } V/LSB) *$ $(\text{Current } LSBs * \text{current sensor gain in } A/LSB) *$ $\text{sample time in seconds} = EL \text{ in } J$ Since sample time is constant, it can be rewritten as EL threshold to avoid computational burden associated with real-time floating point calculation.

So, $EL$ threshold =

$\text{Voltage } LSBs * \text{Current } LSBs = EL \text{ in } J/(\text{voltage sensor gain in }$ $V/LSB * \text{current sensor gain in } A/LSB * \text{sample time in seconds})$ Step 406 is a step that involves maintaining the ECB and monitoring for over current and energy level. For example, during operation, perform the interrupt-triggered low energy limit (LEL) calculations, wherein, if the current exceeds an OC (overcurrent) threshold that is below a current level threshold, perform higher energy limit (HEL) calculations, and if the HEL is not exceeded, maintain full activation of the ECB, otherwise initiate a shutoff routine to shutoff the ECB.

Figure 5A:
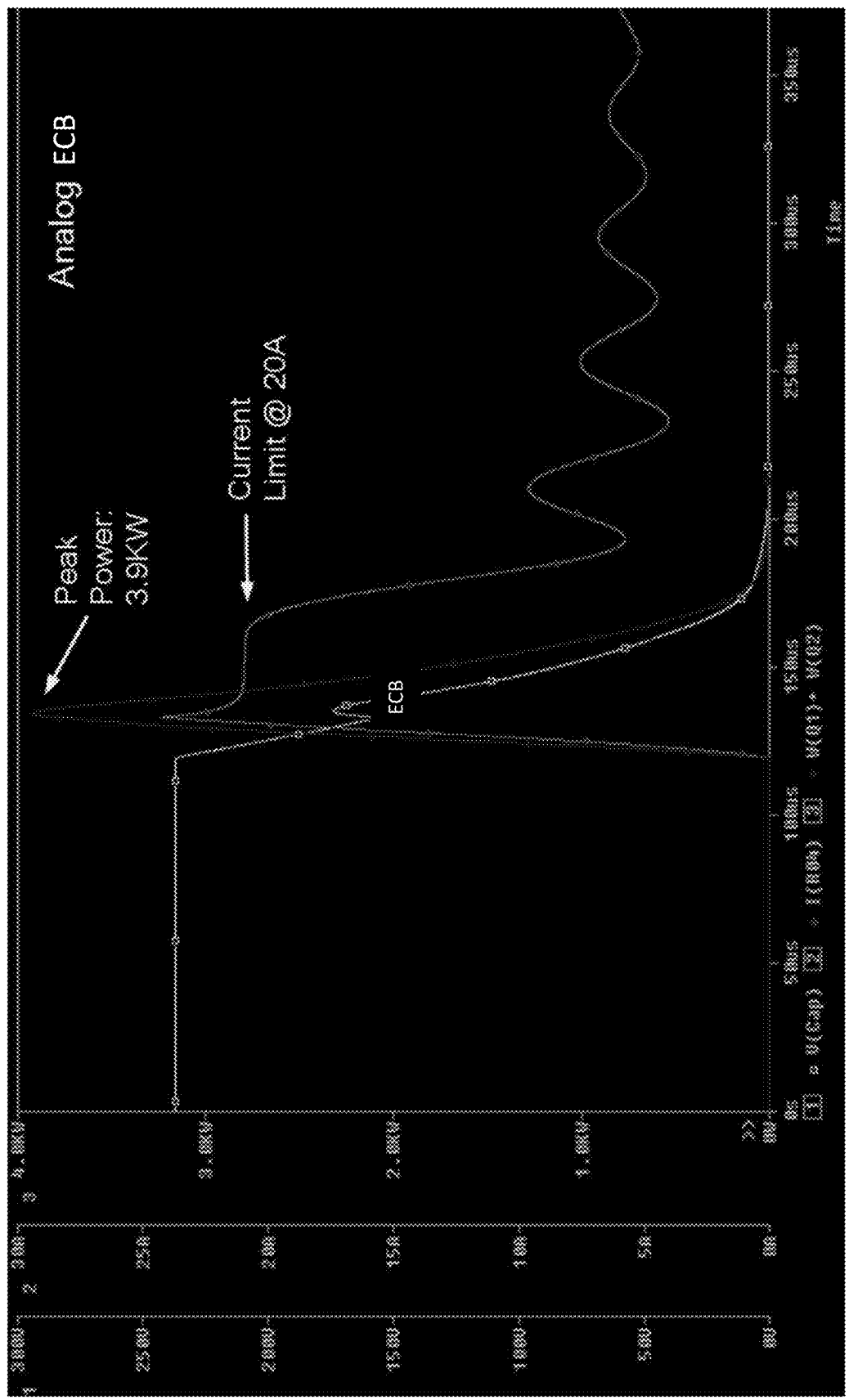
FIGS. 5A and 5B are start-up wave form charts comparing the current invention to the prior art (5A), in accordance with an embodiment of the present invention.
Figure 5B:
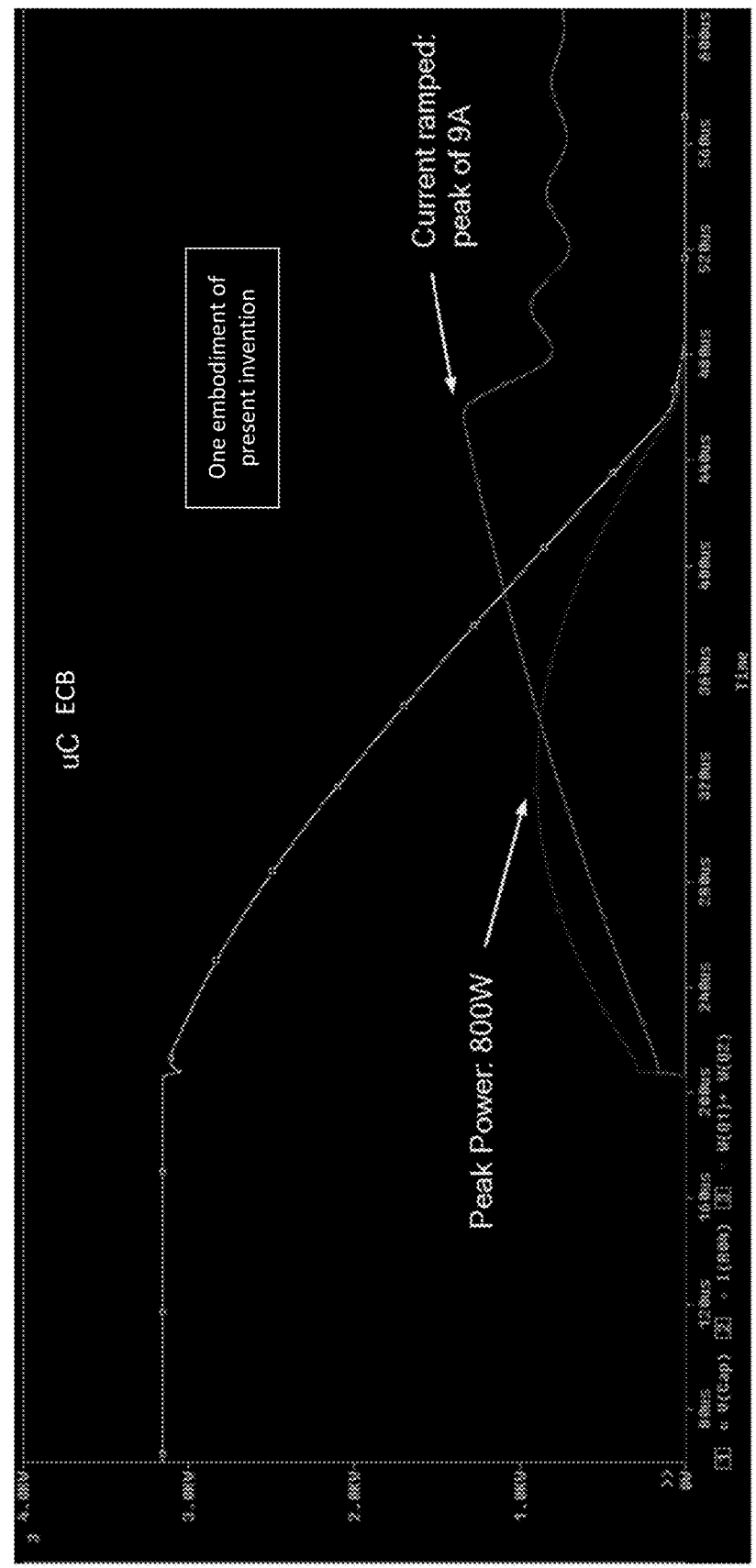

FIG. 5A (prior art) and 5B (one embodiment of the present invention) illustrates the startup power-dissipation control advantage of this invention over the current method through direct control of the startup current over an ECB that starts at a constant 20 A current limit. As shown, the peak power at startup was reduced by almost 5 times (800 W) compared to the constant current method (3.9 KW) when starting into a 40-ohm load with a 240 volt source. It is noted that not all current method utilizes direct constant current at startup.

However, it is shown that the present invention has advantages over the prior art, such as, improved self-protection of the switching device (MOSFET) during startup and improvements are achieved by directly controlling the current during startup and shutting off using an energy limit appropriate for the MOSFET, just to name a few.

Figure 5C:
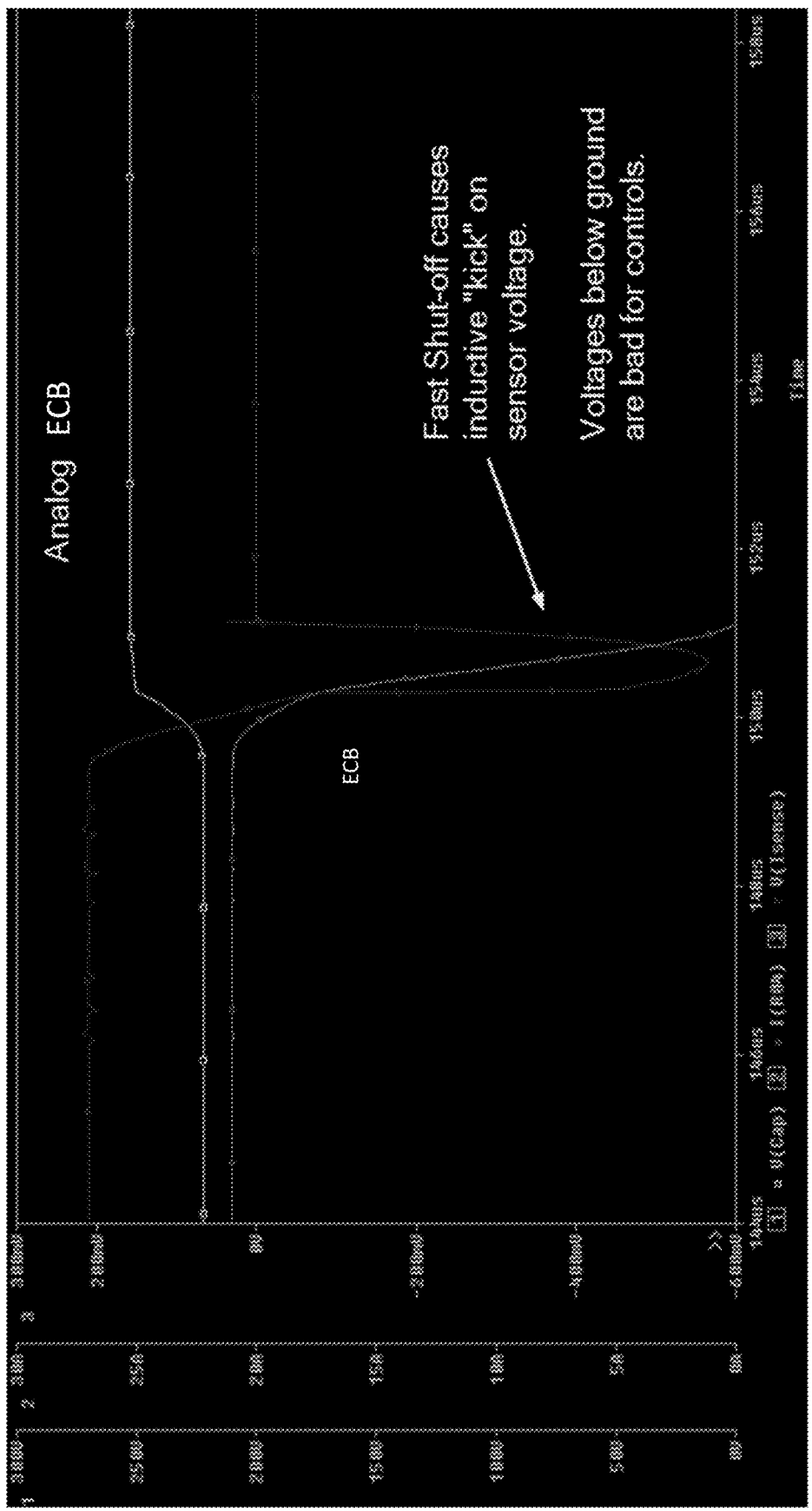
FIGS. 5C and 5D are shut off wave form charts comparing the current invention to the prior art (5C), in accordance with an embodiment of the present invention.
Figure 5D:
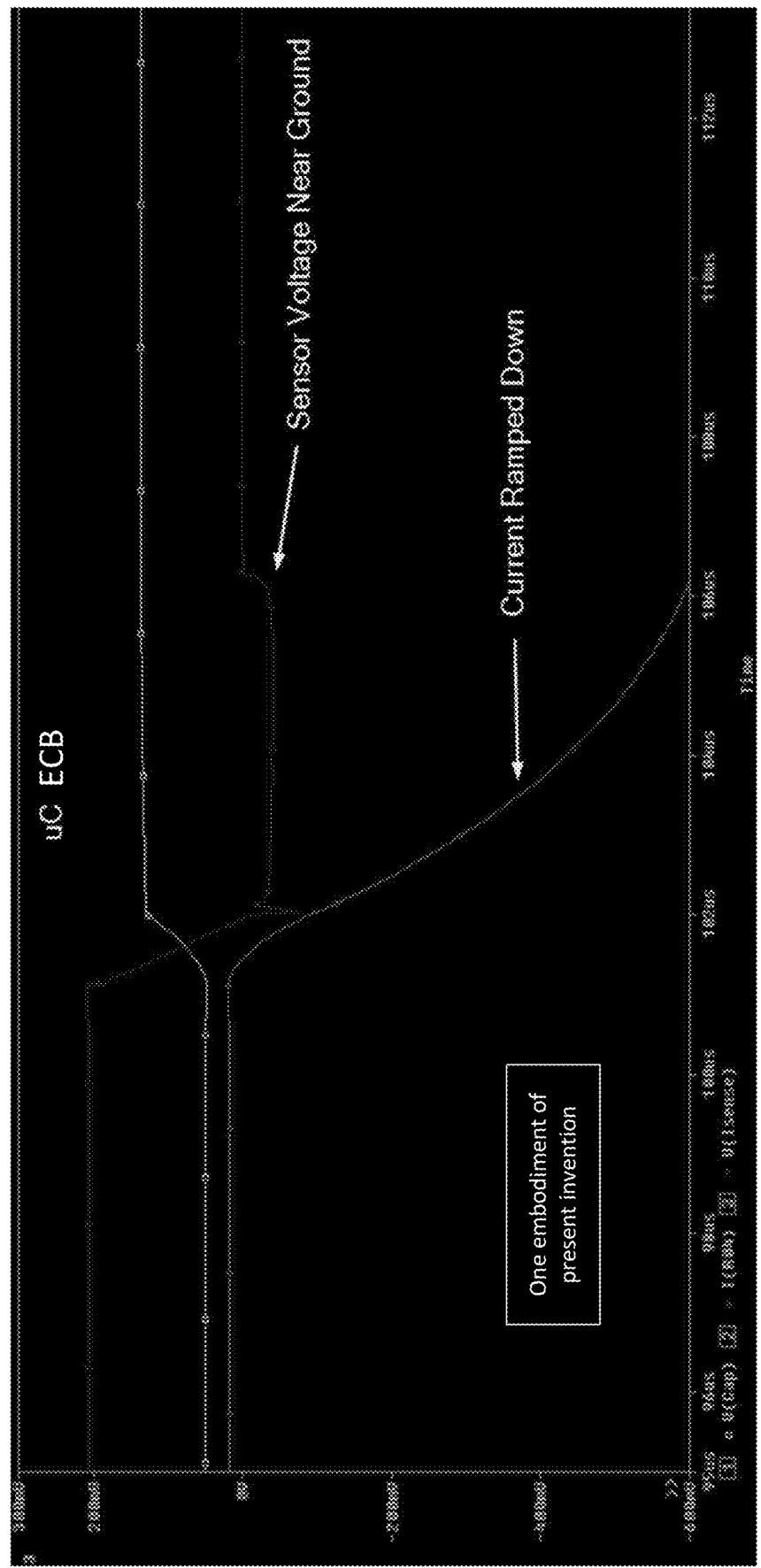

FIG. 5C (prior art) and 5D (one embodiment of the present invention) illustrates the mitigation of damaging negative voltages due to inductive "kick" at shutoff. As shown the sensor voltages are near ground during shutoff compared to large negative voltage swing in prior art.

Figure 6A:
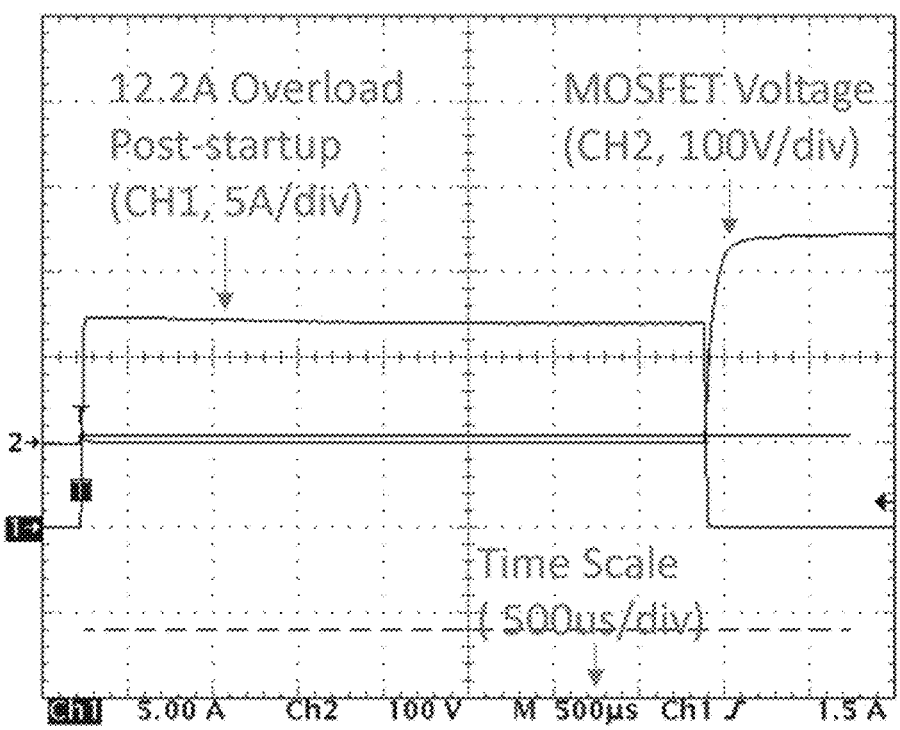
FIGS. 6A-6D are oscilloscope measurements of ECB current and voltage at various conditions, in accordance with an embodiment of the present invention.
Figure 6B:
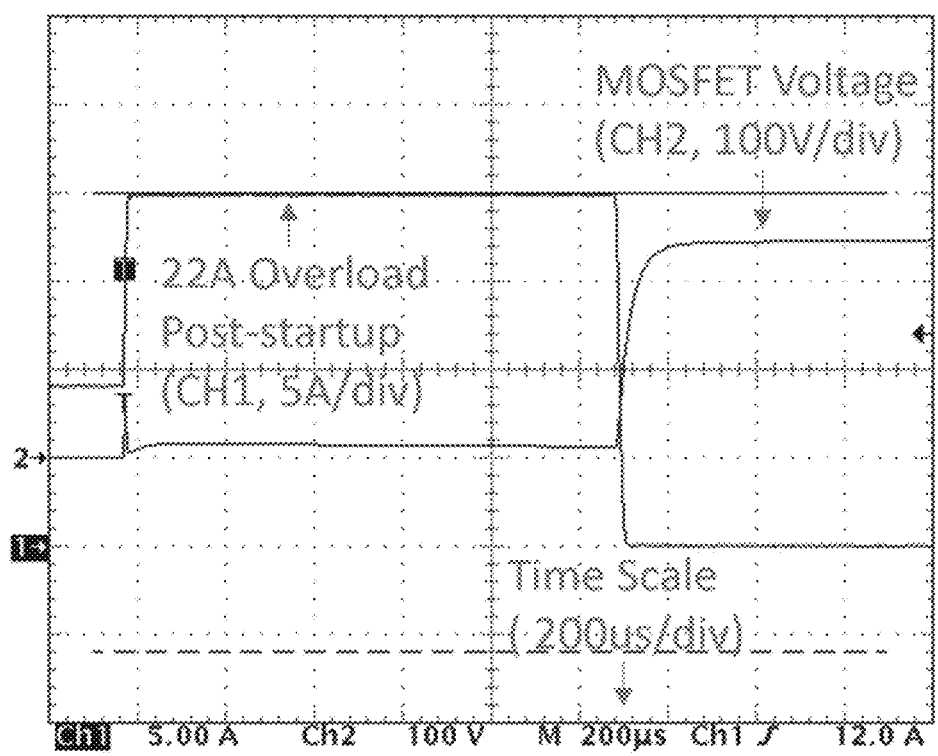
Figure 6C:
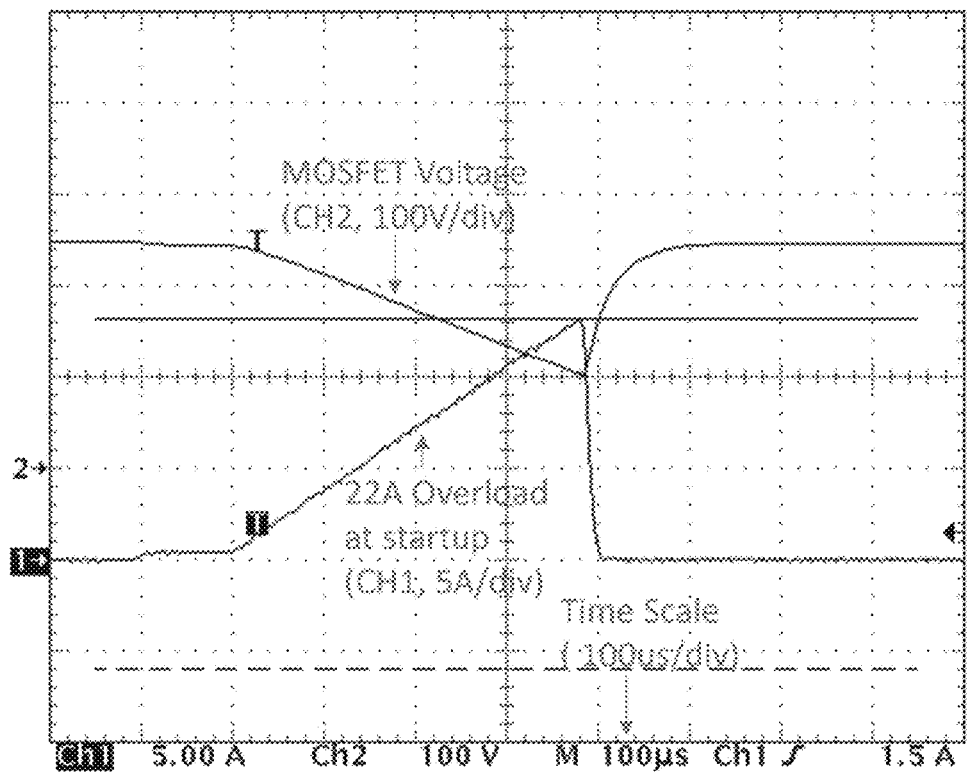
Figure 6D:
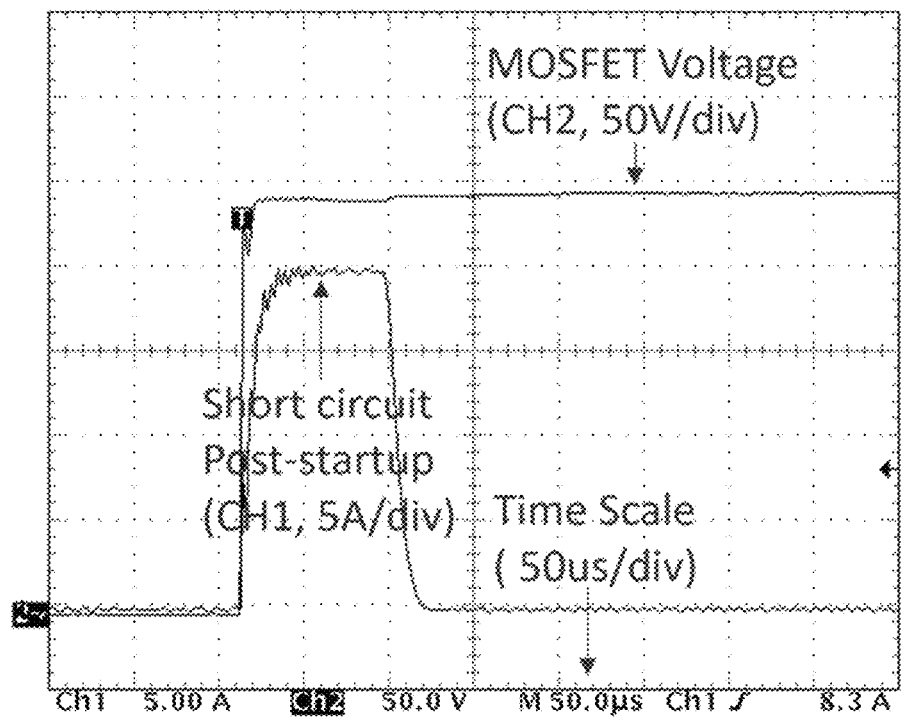

FIG. 6A-6D illustrates power dissipation control dynamics and capabilities during ECB operation due to dual overcurrent thresholds and energy limits as implemented and verified in a hardware prototype. FIG. 6A is an example of ECB over-current response. As shown, in FIG. 6A, the ECB tolerates a post-startup 12.2 A overload for about 3600 µs. FIG. 6B is an example of ECB current-limiting response. In FIG. 6B, the ECB tolerates a post-startup 22 A overload for about 1120 µs. Note that this overload would take cause 22 A to flow, but the ECB limits the current to 20 A. FIG. 6C is an example of the ECB starting into an overload. In FIG. 6C, the ECB started into a 22 A overload shuts off after about 380 µs. FIG. 6D is an example of ECB short circuit response. FIG. 6D illustrates a short-circuit test where the ECB shuts off after about 80 µs due to post-startup short-circuit.

The benefits of the present invention can be re-summarized below.

Benefit 1) Improved self-protection of the switching device (MOSFET) during startup. Improvements are achieved by directly controlling the current during startup and shutting off using an energy limit appropriate for the MOSFET.

Benefit 2) Improved self-protection of the switching device (MOSFET) during overloads and short circuits. Improvements are achieved by having dual energy thresholds (as described elsewhere) appropriate for the Safe Operating Area of the MOSFET.

Benefit 3) Improved ride-through during unusual conditions (like overloads or supply voltage dips) that would otherwise cause the ECB to trip. The dual energy limit thresholds and current limiting avoids "hair trigger" responses that would affect system operation.

Benefit 4) Reduced component stress during turn-off. Improvements are made by ramping down the current limit to avoid negative voltages on control signals.

Benefit 5) Flexibility to support different switching devices (MOSFETs), different system voltages, different loads, and configurations like parallel ECBs. This benefit is achieved by using programmable, downloadable, thresholds and parameters.

Benefit 6) Provide additional features and better diagnostics than typical ECBs. There are numerous "enhanced" features and diagnostics described elsewhere.

Embodiment of System, Computer Program Product and Methods

The descriptions of the various embodiments of the present invention have been presented for purposes of illustration but are not intended to be exhaustive or limited to the embodiments disclosed. Many modifications and variations will be apparent to those of ordinary skills in the art without departing from the scope and spirit of the described embodiments. The terminology used herein was chosen to best explain the principles of the embodiments, the practical application or technical improvement over technologies found in the marketplace, or to enable others of ordinary skills in the art to understand the embodiments disclosed herein.

The present invention may be embodied as a system, a method, and/or a computer program product. The computer program product may include a computer readable storage medium (or media) having computer readable program instructions thereon for causing a processor to carry out aspects of the present invention.

The medium may be an electronic, magnetic, optical, electromagnetic, infrared or a semi-conductor system for a propagation medium. Examples of a computer-readable medium may include a semi-conductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W), DVD and Blu-Ray-Disk.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disk read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object-oriented programming language such as Smalltalk, C++ or the like, and conventional procedural programming languages, such as the "C" programming language or similar programming languages. The computer readable program instructions may execute entirely on the user's computer, partly on the user's computer as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatuses, or another device to cause a series of operational steps to be performed on the computer, other programmable apparatus or other device to produce a computer implemented process, such that the instructions which execute on the computer, other programmable apparatuses, or another device implement the functions/acts specified in the flowchart and/or block diagram block or blocks.

The flowcharts and/or block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or act or carry out combinations of special purpose hardware and computer instructions.

The terminology used herein is for the purpose of describing particular embodiments only and is not intended to limit the invention. As used herein, the singular forms "a", "an" and "the" are intended to include the plural forms as well, unless the context clearly indicates otherwise. It will further be understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or steps plus function elements in the claims below are intended to include any structure, material, or act for performing the function in combination with other claimed elements, as specifically claimed. The description of the present invention has been presented for purposes of illustration and description but is not intended to be exhaustive or limited to the invention in the form disclosed. Many modifications and variations will be apparent to those of ordinary skills in the art without departing from the scope and spirit of the invention. The embodiments are chosen and described in order to best explain the principles of the invention and the practical application, and to enable others of ordinary skills in the art to understand the invention for various embodiments with various modifications, as are suited to the particular use contemplated.

Additionally, the proposed concept may be summarized in a nutshell in the following clauses:
  Direct current control during startup:
    No pre-charge circuit needed
    Optimized MOSFET protection
    Optimized load protection
  Multiple MOSFET energy monitoring modes:
    Low energy limit when MOSFET is in linear mode (not fully enhanced)
    High energy limit when MOSFET is fully enhanced
  Controlled shutoff:
    Shutoff against excessive energy
    Avoids damaging negative voltages due to inductive 'kick'
  Enabling additional features:
    Enhanced protection with enhanced diagnostics
    Fully functional prototype hardware with $0.50 micro
  Direct control of startup current and optimized MOSFET (per operating modes) and load energy-based protection, etc.
  Optimized MOSFET (per operating modes) and load protection controlled shutoff ramp
  A/D based telemetry for current and voltages
  Fully customizable digital thresholds
  Plug detect wrapped through cable minimizes arcing during hot unplug
  Input voltage out of spec diagnostic indication
  Input voltage PLD detection
  Load protected from input 0V (via firmware disable)
  Input under-voltage lock out
  Fuse open or high resistance diagnostic
  MOSFET diagnostics (leaky, shorted, high resistance)
  Detection of on/off state mismatch between redundant SCBs
  Bias voltage UVLO
  Auto-start/power fault recovery
  Enable staggering avoids inrush
  Digital filtering of threshold excursions adds noise immunity and filters transients
  A/D readings allow distinction between insane sensor readings and load/source faults
  Snooping output voltage allows SCBs to start in parallel without synchronized commands
  Customized current limits minimize fault energy requirements improving system efficiency and sustainability Furthermore, other embodiments and/or advantages of the proposed concept may be summarized in a nutshell in the following clauses:
  Direct current control during startup (no pre-charge circuit needed):
  The usage of the "DAC_out" signal to control current during startup is described elsewhere in this document. Other ECB circuits (prior art) start up in different ways. One other way is to use a pre-charge circuit. The pre-charge circuit uses an additional MOSFET and a high-power resistive element (resistor or PTC resistor) to charge up the output prior to enabling the main MOSFET. Another way to start up is to use voltage feedback to force the output voltage to follow a predefined start up ramp. The current method of startup is better because it is more flexible; we can control the ramp rate and also use different current waveforms like constant current or exponentially rising current. Unlike the other startup methods, no additional circuitry is needed.
  Concurrent MOSFET energy monitoring during startup and operation.
  Multiple energy limits depending on operating modes.
  High energy limit when MOSFET is fully enhanced and lower energy limit otherwise:
  The ECB uses current, voltage, and time to calculate energy in the MOSFET. Excessive energy triggers the ECB to disable the MOSFET. Protecting a circuit based on energy has been done in other types of circuitry. However, the present invention, the ECB uses a unique dual threshold for protection. This provides robust protection for the MOSFET, yet also minimizes nuisance trips.
  Programmable control parameters optimized for MOSFET and load protection:
  All thresholds and timings can be easily modified by the host computer. This allows a single hardware design to be used in many applications without modification. The parameters can be optimized for different system voltages and power levels. If a component in the circuit (the MOSFET, for example) needs to be substituted for availability, cost, or obsolescence reasons, the ECB parameters can be modified to accommodate the new component's characteristics.
  Controlled shutoff avoids damaging negative voltages due to inductive "kick":
  When shutting off, the ECB ramps down the current through the MOSFET. Avoiding fast shut-off keeps the sensor voltages from ringing to a large negative voltage due to inductances in the circuit. This avoids circuit damage that might occur when shutting down at high current. The current ramp time is programmable to provide maximum flexibility.

What is claimed is:

1. An ECB (electronic circuit breaker) device, comprising:
 the ECB coupled to one or more power sources, one or more loads and a host PC;
 the ECB comprises of, one or more microcontrollers, one or more analog limiting current circuits and one or more wiring connections, wherein the one or more wiring connections is coupled to one or more circuit elements, the one or more microcontrollers, the analog limiting current circuit, the one or more power sources, the one or more loads and the host PC and the ECB contains a plug detect wire from the one or more wiring connections to detect a presence of the one or more wiring connections; and
 the one or more circuit elements comprises, one or more MOSFETs (metal oxide field effect transistors), one or more capacitors, one or more resistors, one or more inductors, one or more fuses.

2. The ECB device of claim 1, further comprising:
 the one or more wiring connections is coupled to one or more heatsink thermal sensors, wherein the one or more heatsink thermal sensors comprises of a thermistor or other type of thermal sensor.

3. The ECB device of claim 1, contains a wire coupled to one or more RC (resistor capacitor) filters, wherein the one or more RC filters incoming current of the one or more loads from the one or more wiring connections.

4. The ECB device of claim 1, the one or more microcontrollers further comprises of at least 8 A/D inputs, at least one DAC output, one or more general purpose I/O (input/output) pins and at least an 8-bit architect.

5. The ECB device of claim 1, the one or more analog current limiting circuit comprises of one or more operation amplifier, transistors, resistors, capacitors, and diodes.

6. The ECB device of claim 1, contains a current sense wire from the one or more wiring connections to detect a presence of current from the one or more wiring connections.

7. A method for power distribution at high voltage, leveraging an electronic circuit breaker (ECB) controlled by a microcontroller, the method comprising:
 the microcontroller configured to execute program instructions to:
  at startup, incrementally increase a microcontroller output of an ECB from an initial current to a current limit (CL) threshold;
  perform low energy limit (LEL) calculations based on current and voltage readings and a Gate_Low input, wherein if the LEL threshold has not been exceeded, then the ECB is fully activated, otherwise a shutoff routine is initiated to shutoff the ECB; and
  during operation, perform high energy limit (HEL) calculations based on the Gate_Low input and the current and voltage reading, wherein, if the current exceeds an OC (over-current) threshold that is below a CL (current limit) threshold, then perform higher the energy limit (HEL) calculations, and if HEL threshold has not been exceeded by the HEL calculation, then maintaining full activation of the ECB, otherwise initiate a shutoff routine to shutoff the ECB.

8. The method of claim 7, wherein the LEL and the HEL calculations can be derived from EL formula, "Energy=Voltage * Current * Time", wherein voltage is equal to (Voltage LSBs * voltage sensor gain in Voltage/LSB), and current is equal to Current LSBs * current sensor gain in Amperage/LSB), Time is equal to sample time in seconds and LSB denotes least significant bit.

9. The method of claim 7, wherein the LEL threshold, the CL threshold, the OC threshold and the HEL threshold are user configurable and predetermined and the LEL threshold and HEL threshold can be derived from a EL threshold formula, "EL threshold=Voltage LSB * Current LSB".

10. The method of claim 7, wherein incrementally increasing current limit value by increasing DAC output of the microcontroller.

11. The method of claim 7, wherein the current and voltage readings are determined by values from a FET_V input and a Current Sense input into the microcontroller.

12. The method of claim 7, wherein the Gate_Low input is an input from an ACLC (Analog Current Limiting Circuit) coupled to MOSFETs that signifies a status of the MOSFETs.

13. The method of claim 7, further comprising:
 during operation, perform a housekeeping routine, comprising of, resetting timers, gradually decreasing values of LE (low energy) and monitoring sensors inside the ECB.

14. A system for power distribution in a high voltage, the system comprising:
 an ECB;
 a power source;
 a bias power source;
 a cabling bundle;
 a load;
 a host computer;
 one or more computer processors belonging to the ECB; and
 one or more computer readable storage media having computer-readable program instructions stored on the one or more computer readable storage media for execution by at least one of the one or more computer processors belonging to the ECB, said program instructions executes a computer-implemented method comprising the steps of:
  at startup, incrementally increase a microcontroller output of an ECB from an initial current to a current limit (CL) threshold;
  perform low energy limit (LEL) calculations based on current and voltage readings and a Gate_Low input, wherein if the LEL threshold has not been exceeded, then the ECB is fully activated, otherwise a shutoff routine is initiated to shutoff the ECB; and
  during operation, perform high energy limit (HEL) calculations based on the Gate_Low input and the current and voltage reading, wherein, if the current exceeds an OC (over-current) threshold that is below a CL (current limit) threshold, then perform the higher energy limit (HEL) calculations, and if HEL threshold has not been exceeded by the HEL calculation, then maintaining full activation of the ECB, otherwise initiate a shutoff routine to shutoff the ECB.

15. The system of claim 14, wherein the LEL and the HEL calculations can be derived from EL formula, "Energy=Voltage * Current * Time", wherein voltage is equal to (Voltage LSBs * voltage sensor gain in Voltage/LSB), and current is equal to Current LSBs * current sensor gain in Amperage/LSB), Time is equal to sample time in seconds and LSB denotes least significant bit.

16. The system of claim 14, wherein the LEL threshold, the CL threshold, the OC threshold and the HEL threshold are user configurable and predetermined and the LEL threshold and HEL threshold can be derived from a EL threshold formula, "EL threshold=Voltage LSB * Current LSB".

17. The system of claim 14, wherein incrementally increase voltage to a startup current limit value further comprises, instructing DAC output of the microcontroller to increase the voltage.

18. The system of claim 14, wherein the current and voltage readings are determined by values from a FET_V input and a Current Sense input into the microcontroller.

19. The system of claim 14, wherein the Gate_Low input is an input from an ACLC (Analog Current Limiting Circuit) coupled to MOSFETs that signifies a status of the MOSFETs.

* * * * *